United States Patent
Kang et al.

(10) Patent No.: US 11,117,512 B2
(45) Date of Patent: Sep. 14, 2021

(54) ILLUMINATION SYSTEM FOR A VEHICLE

(71) Applicant: Ford Global Technologies LLC, Dearborn, MI (US)

(72) Inventors: Derek Kang, Nanjing (CN); Mauricio Acosta Loyola, Mexico City (MX); Diego Elias Ramirez, University City, MO (US); Daniel Weckstein, West Bloomfield, MI (US); Wei Xu, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 357 days.

(21) Appl. No.: 16/298,701

(22) Filed: Mar. 11, 2019

(65) Prior Publication Data

US 2019/0283664 A1    Sep. 19, 2019

(30) Foreign Application Priority Data

Mar. 13, 2018  (CN) .......................... 201810203968.2

(51) Int. Cl.
| | |
|---|---|
| *B60Q 1/32* | (2006.01) |
| *B60Q 3/82* | (2017.01) |
| *B60Q 3/51* | (2017.01) |
| *B60Q 3/30* | (2017.01) |

(52) U.S. Cl.
CPC .............. *B60Q 1/323* (2013.01); *B60Q 3/30* (2017.02); *B60Q 3/51* (2017.02); *B60Q 3/82* (2017.02)

(58) Field of Classification Search
CPC . B60Q 1/323; B60Q 3/51; B60Q 3/30; B60Q 3/82; B60Q 9/00; B60Q 9/008; B60Q 1/0094; B60Q 1/0683; B60Q 1/52; B60Q 1/30; B60Q 1/46; B60Q 2900/10; B60Q 1/0035
See application file for complete search history.

(56) References Cited

U.S. PATENT DOCUMENTS

| | | | | |
|---|---|---|---|---|
| 2,891,235 A | * | 6/1959 | Halpert ..................... | B60Q 3/30 340/472 |
| 3,582,639 A | * | 6/1971 | Chamberlain ............ | B60Q 3/30 362/542 |
| 4,054,789 A | * | 10/1977 | Romanelli ............... | B60Q 1/52 362/542 |

(Continued)

FOREIGN PATENT DOCUMENTS

| | | |
|---|---|---|
| DE | 102015111629 A1 | 2/2016 |
| JP | 2016112907 A | 6/2016 |
| WO | 2017098109 A1 | 10/2017 |

OTHER PUBLICATIONS

OLM JDM Precision LED Lift Gate Light—14-18 Forester, SubiSpeed, retrieved from http://www.subispeed.com/2014-subaru-forester/lighting/olm-jdm-precision-led-lift-gate-light-2014-forester#.XIPJVyhKjb2.

*Primary Examiner* — Luis A Martinez Borrero
(74) *Attorney, Agent, or Firm* — David Coppiellie; Kolitch Romano LLP

(57) ABSTRACT

The present disclosure discloses an illumination system for a vehicle. The illumination system includes an illumination device having a light source and a bracket connected to the light source. The bracket is adapted to be rotatably connected on an inner surface of a movable closure of the vehicle, and the bracket is adjacent to a top of the vehicle when the movable closure is in an opened position.

20 Claims, 6 Drawing Sheets

(56) References Cited

U.S. PATENT DOCUMENTS

| | | | | |
|---|---|---|---|---|
| 4,851,970 A * | 7/1989 | Bronder | B60Q 1/302 | 362/485 |
| 5,126,925 A * | 6/1992 | Mintgen | B60Q 3/30 | 267/120 |
| 5,521,806 A * | 5/1996 | Hutzel | B60Q 7/00 | 340/473 |
| 5,580,153 A * | 12/1996 | Motz | B60Q 1/302 | 362/496 |
| 5,844,367 A * | 12/1998 | Agans, Jr. | B60Q 3/30 | 315/84 |
| 6,133,827 A | 10/2000 | Alvey et al. | | |
| 6,763,778 B2 * | 7/2004 | Bergquist | B60Q 1/302 | 116/28 R |
| 7,052,163 B2 | 5/2006 | George | | |
| 7,226,112 B2 * | 6/2007 | Ward | B60J 5/101 | 296/146.8 |
| 7,673,927 B2 * | 3/2010 | Brockhoff | B60J 5/105 | 296/146.11 |
| 7,705,720 B2 * | 4/2010 | Jachmann | B60Q 7/00 | 340/473 |
| 8,378,575 B2 * | 2/2013 | Illium | B60J 5/101 | 315/77 |
| 8,552,852 B1 * | 10/2013 | Hertz | B60Q 1/305 | 340/468 |
| 9,487,134 B2 * | 11/2016 | Munday | B60Q 3/44 | |
| 9,840,193 B1 * | 12/2017 | Chea | B60Q 3/217 | |
| 9,863,621 B2 * | 1/2018 | Dai | F21V 23/04 | |
| 10,292,231 B2 * | 5/2019 | Gaborieau | B60Q 1/44 | |
| 10,501,008 B2 * | 12/2019 | Snider | B60J 1/1876 | |
| 10,857,934 B2 * | 12/2020 | Tsuchiya | H05B 47/105 | |
| 2004/0130902 A1 * | 7/2004 | Snyder | B60Q 3/30 | 362/485 |
| 2006/0279108 A1 * | 12/2006 | Brockhoff | B60J 5/105 | 296/202 |
| 2010/0244697 A1 * | 9/2010 | Illium | B60Q 1/30 | 315/77 |
| 2014/0153269 A1 * | 6/2014 | Huang | B60Q 1/52 | 362/464 |
| 2015/0197194 A1 * | 7/2015 | Salter | B60Q 3/68 | 362/510 |
| 2015/0343944 A1 * | 12/2015 | Salter | B60Q 3/76 | 362/510 |
| 2016/0001700 A1 * | 1/2016 | Salter | B60Q 1/24 | 362/510 |
| 2016/0257247 A1 * | 9/2016 | Munday | B60Q 1/2696 | |
| 2017/0246984 A1 * | 8/2017 | Snider | B60J 1/1876 | |
| 2017/0290122 A1 * | 10/2017 | Gaborieau | F21S 43/19 | |
| 2018/0119915 A1 * | 5/2018 | Elwell | B60Q 1/2696 | |
| 2018/0170252 A1 * | 6/2018 | Backman | B60Q 3/82 | |
| 2018/0257545 A1 * | 9/2018 | Miranda Nieto | H02J 7/0045 | |
| 2018/0339651 A1 * | 11/2018 | Salter | F21S 43/16 | |
| 2019/0031093 A1 * | 1/2019 | Castillo Jaime | B60Q 3/82 | |
| 2019/0106053 A1 * | 4/2019 | Chen | B60Q 3/80 | |
| 2019/0176679 A1 * | 6/2019 | Salter | B60Q 9/006 | |

* cited by examiner

ILLUMINATION SYSTEM FOR A VEHICLE

RELATED APPLICATION

This application claims the benefit of Chinese Patent Application No. CN 201810203968.2, filed Mar. 13, 2018, the entire contents thereof being incorporated herein by reference.

FIELD

The present disclosure relates to an illumination system of a vehicle, in particular, relates to an illumination system providing adjustable illumination area at a rear and a side the vehicle a vehicle.

BACKGROUND

Some vehicles include an illumination device in an interior of a trunk such as at a side or a top surface of the trunk. The illumination device lights up when a trunk lid is opened so that it is easy for a user to arrange or take out items from the trunk in a dark environment. Some vehicles include an illumination device at the trunk lid and the illumination device lights up to illuminate an area adjacent to a rear gate of the vehicle as the trunk lid is opened. Such illumination device is typically fixed on a particular position of the trunk for lighting only the fixed trunk area.

SUMMARY

An aspect of the present disclosure provides an illumination system for a vehicle. The illumination system includes an illumination device having a light source and a bracket connected to the light source. The bracket is adapted to be rotatably connected on an inner surface of a movable closure of the vehicle, and the bracket is adjacent to a top of the vehicle when the movable closure is in an opened position. An illumination area of the light source varies as the bracket rotates.

In one embodiment, the movable closure is a lift gate of the vehicle.

In another embodiment, the bracket is connected to the movable closure via a pivoting pin. The bracket is rotatable around an axis parallel to a widthwise or a lengthwise direction of the vehicle.

In another embodiment, the illumination system further includes a damper coupled to the pivoting pin to adjust a rotating speed of the bracket.

In another embodiment, the bracket is connected to the movable closure via a universal joint.

In another embodiment, the universal joint includes a housing fixed on the movable closure and a rotary element fixed on the bracket, the housing has a ball-shaped chamber therein, and the rotary element has a ball-shaped body, and the body is received and movable in the chamber.

In another embodiment, the universal joint includes a first element fixed to the movable closure, a second element fixed to the bracket, and a cross-shaped element connecting the first and second elements. The first element includes two spaced apart first arms each having a first hole, the second element includes two space apart second arms each having a second hole, and the cross-shaped elements includes a first bar and a second bar crossed with each other. Two ends of the first bar are received in first holes of the first arm and rotatable round a first axis, and two ends of second bar are received in second holes of the second arm and rotatable round a second axis substantially perpendicular to the first axis.

In another embodiment, the illumination device further includes a detachable lens covering the light source and dispensing light beams emitted by the light source.

In another embodiment, the bracket includes a first baffle plate and a second baffle plate disposed at two opposite ends thereof. The first baffle plate includes a first recessed portion and the second baffle plate includes a second recessed portion. The lens has a protrusion at a first side and a flexible clip at a second side, and the clip is configured to be deformable to facilitate an assembling of the lens on the bracket.

In another embodiment, the illumination system further includes a switch to manually activate and deactivate the light source.

In another embodiment, the illumination system further includes a controller configured to activate the light source when at least one vehicle condition is met.

In another embodiment, the vehicle condition includes the movable closure in the opened position and a power system of the vehicle at an "off" status.

In another embodiment, the vehicle conditions include the movable closure in the opened position and a speed of the vehicle less than a threshold speed.

In another embodiment, the light source is coupled to a battery of the vehicle, and the vehicle condition includes a state of charge of the battery larger than a state of charge threshold.

Another aspect of the present disclosure provides an illumination system for a vehicle. The illumination system includes two illumination devices disposed on an inner surface of a movable closure of the vehicle and spaced apart each other and a controller. Each illumination device includes a bracket and a light source connected to the bracket. The bracket is rotatably connected to an inner surface of movable closure of the vehicle and rotatable such that an illumination area of the light source varies as the bracket rotates. The two illumination devices are located adjacent to a vehicle floor when the movable closure is in a closed position, and located adjacent to a top of the vehicle when the movable closure is in an opened position. The controller is configured to selectively activate the two illumination devices in response to at least one vehicle condition.

In one embodiment, the bracket of each of the two illumination devices is configured to rotate around an axis parallel to a widthwise direction of the vehicle.

In another embodiment, the bracket of one of the two illumination devices is configured to rotate around an axis parallel to a widthwise direction of the vehicle, and the bracket of another of the two illumination devices is configured to rotate around an axis parallel to a lengthwise direction of the vehicle.

In another embodiment, the at least one vehicle condition includes one of the following conditions: the moveable closure is in the opened position, the vehicle is moving in reverse at a speed less than about 5 kph, and an environment illumination is less than an illumination threshold.

In another embodiment, the controller is further configured to open the movable closure in response to a signal indicating an "off" status of a power source of the vehicle and a signal indicating unlocking of a vehicle door.

In another embodiment, the illumination system further includes an independent power source to supply power to the illumination system.

In another embodiment, the controller is further configured to turn off the light source of the illumination device in response to a signal indicating a closed status of the movable closure.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

The above advantages and other advantages, and features of the present description will be readily apparent from the following detailed description when taken alone or in connection with the accompanying drawings.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

DETAILED DESCRIPTION

Embodiments of the present disclosure are described herein. It is to be understood, however, that the disclosed embodiments are merely examples and other alternative embodiments can take various forms. The figures are not necessarily to be drawn in scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1A:
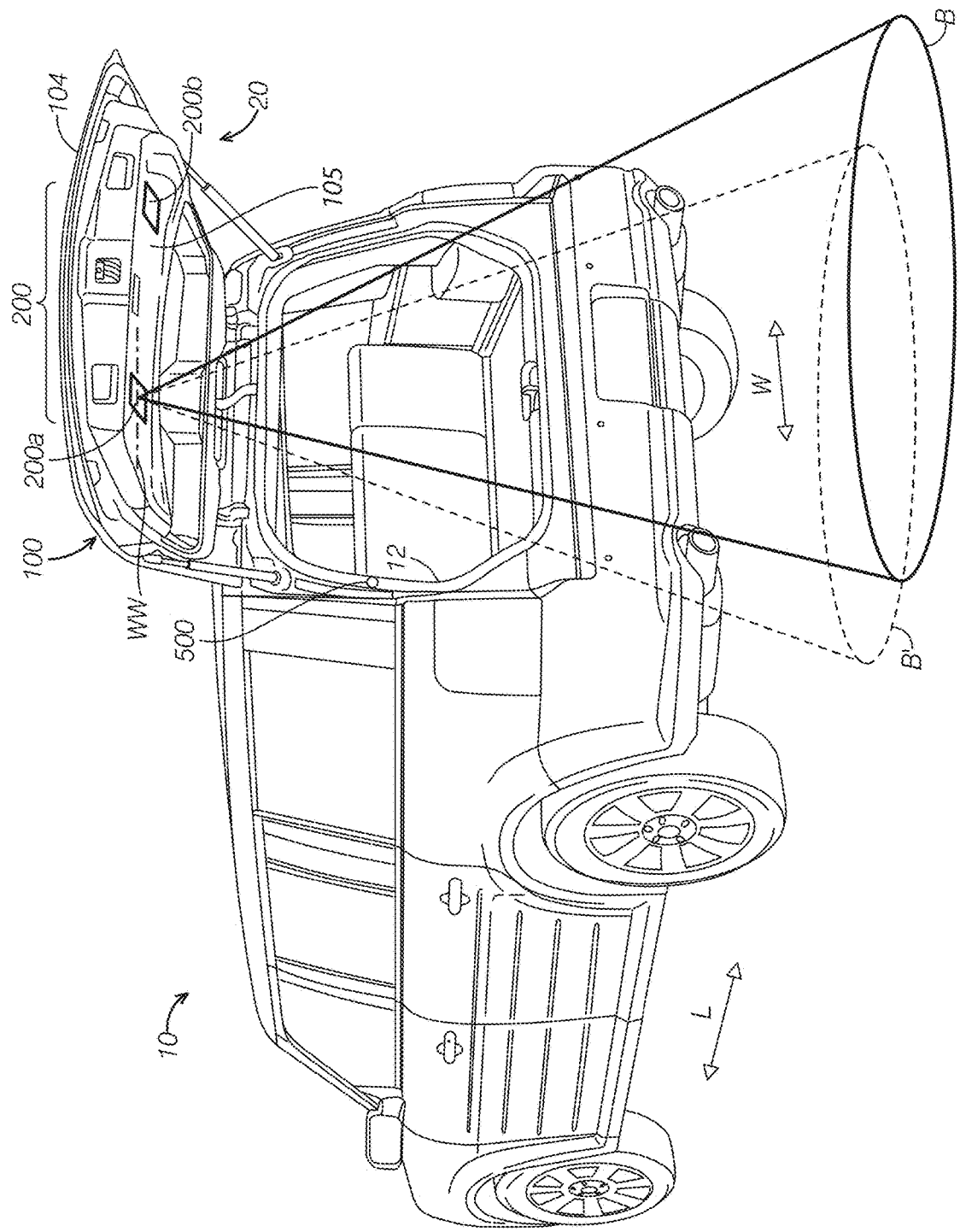
FIG. 1A is a perspective view of a vehicle, illustrating a closure in an opened position, an illumination system and a first illumination area according to an embodiment of the present disclosure.
Figure 1B:
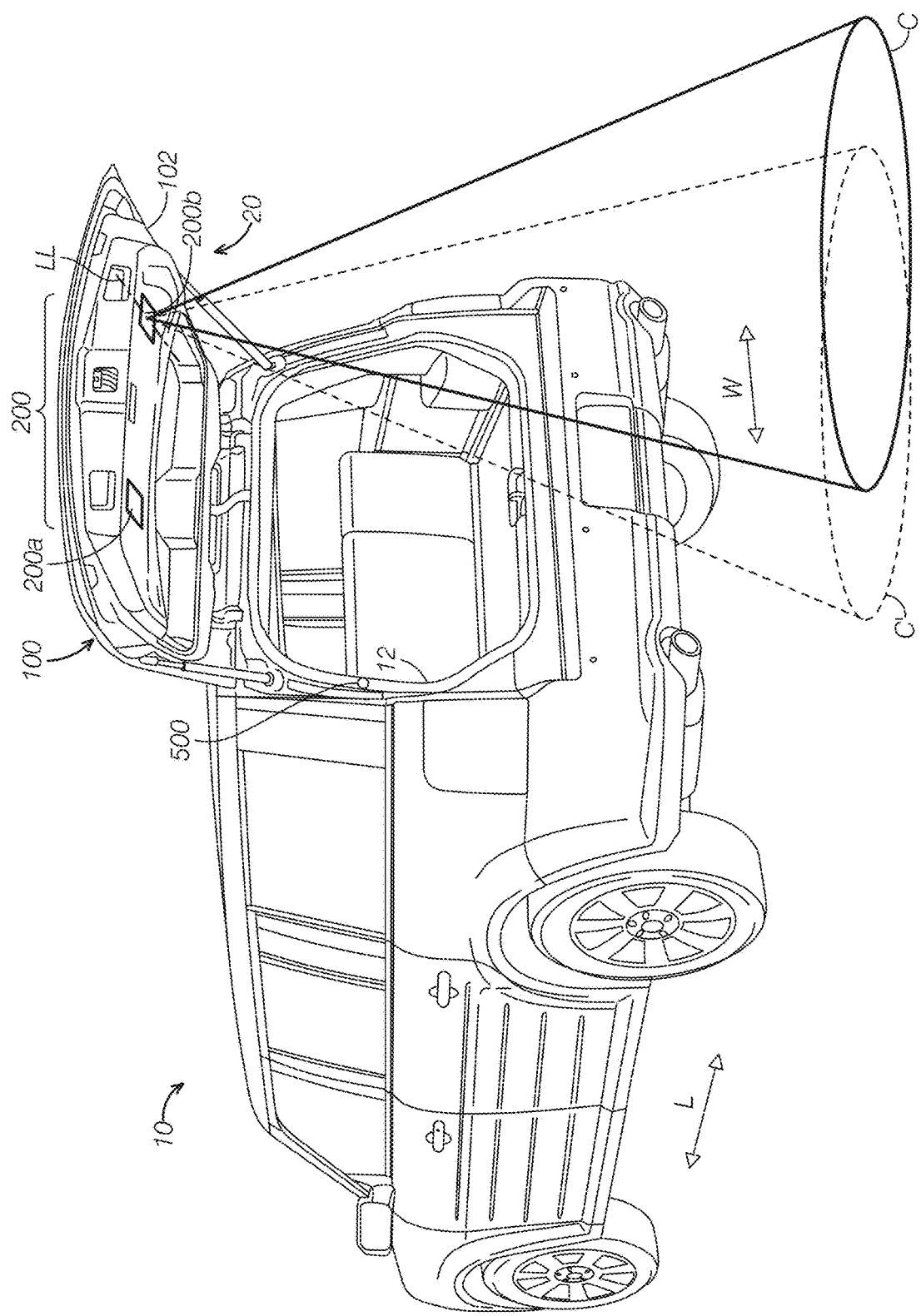
FIG. 1B is a perspective view of the vehicle in FIG. 1A, illustrating a second illumination area of the illumination system.

FIGS. 1A and 1B are perspective views of a vehicle 10, illustrating an illumination system 20 according to an embodiment of the present disclosure. The illumination system 20 may comprise at least one illumination device 200. Referring to FIGS. 1A and 1B, the vehicle 10 may include a movable closure 100 and the illumination device 200 disposed on the movable closure 100. In the depicted embodiment, the movable closure 100 is a lift gate of the vehicle 10. When the movable closure 100 is in an opened position as shown in FIGS. 1A and 1B, the illumination devices 200 are adjacent to or above a top of the vehicle 10, which illuminates areas at a rear and a side the vehicle 10 which is adjacent to the movable closure 100. It should be appreciated that the movable closure 100 may be a trunk lid of a vehicle.

In the embodiments as shown in FIGS. 1A and 1B, the illumination system 20 includes two illumination device 200a, 200b. The illumination device 200a, 200b may be rotatably connected to an inner surface 105 of the movable closure 100. In some embodiments, when the movable closure 100 is in the opened position, the illumination device 200a may be rotatable about an axis WW that is substantially parallel to a widthwise direction W or a transverse direction of the vehicle 10. The rotation of the illumination device 200a changes a direction of light ray. In this way, an illumination area can be adjusted to be relative closer or further away from a rear side 104 of the movable closure 100. In other words, the illumination area can be adjusted along the lengthwise direction L of the vehicle. Referring to FIG. 1A, the illumination device 200a may be adjusted to provide a first illumination area B and a second illumination area B'. The first illumination area B may be more distant to the rear side 104 of the movable closure 100 compared to the second illumination area B'.

In some embodiments, the illumination device 200b may be configured to be rotatable about an axis LL that is substantially parallel to a lengthwise direction L or a longitudinal direction of the vehicle 10 when the movable closure is at the opened position such that an illumination area can be adjusted to be closer or further away from a side wall 102 of the movable closure 100. In other words, the illumination area can be adjusted along the widthwise direction W of the vehicle. Referring to FIG. 1B, the illumination device 200b may have a third illumination area C and a fourth illumination area C', while the third illumination area C may be more distant to the side wall 102 of the movable closure 100 compared to the fourth illumination area C'.

It should be appreciated that, the illumination devices 200a, 200b may be configured to be rotatable about parallel axes. For example, the two illumination devices 200a, 200b may be rotated around the axis WW to collectively adjust illumination areas along the lengthwise direction L of the vehicle 10. Alternatively, the two illumination devices 200a, 200b may be configured to be rotated around the axis LL to collectively adjust illumination areas along the widthwise direction W of the vehicle 10.

In some embodiments as described below, the illumination device 200 may be coupled to the movable closure 100 via a universal joint, and the illumination area may be adjusted at any directions.

It should be appreciated that the illumination system of the present disclosure may include one illumination device or more than two illumination devices.

Figure 2:
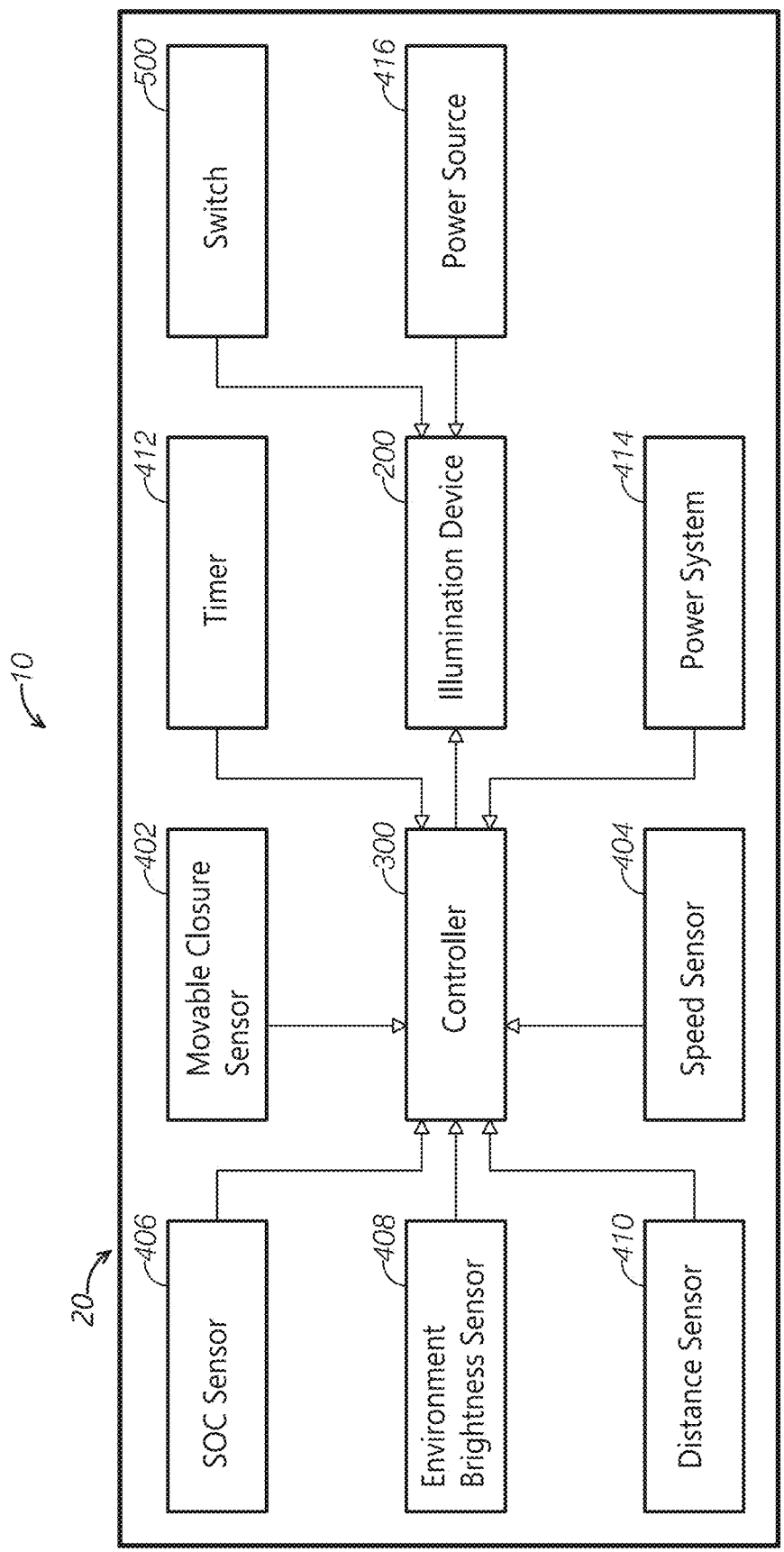
FIG. 2 is a block diagram of the illumination system of the vehicle in FIG. 1A, illustrating communications of the devices of the illumination system.

In some embodiments, referring to FIG. 2, the illumination system 20 further includes a controller 300. The controller 300 is configured to activate the illumination device 200 in response to at least one vehicle condition, such that the illumination device 200 may emit light to provide illumination. The controller 300 may be further in communication with various sensors and other vehicle parts to determine vehicle conditions.

FIG. 2 is a block diagram, illustrating the illumination system 20 in the vehicle 10. Referring to FIG. 2, the illumination system 20 includes a controller 300, an illumination device 200 (e.g., the illumination device 200*a*, 200*b*), and various sensors in communication with the controller 300. The controller 300 may include a processor and a storage unit. The controller 300 may be a separate controller or integrated in a control system of the vehicle. The controller 300 is configured to receive signals from various sensors and/or other vehicle units to determine vehicle conditions and control the illumination device 200 according to one or more vehicle conditions. The vehicle conditions may include at least one of the following conditions: an open status or a closed status of the movable closure 100, a speed of the vehicle, an "on" or an "off" status of a power system of the vehicle, an environment brightness, a state of charge (SOC) of a battery of the vehicle, and a moving direction of the vehicle.

The illumination system 20 may include a movable closure sensor 402 to detect if the movable closure 100 is opened or closed, a speed sensor 404 to detect the state of the vehicle, a SOC sensor 406 to detect the SOC of the battery, a brightness sensor 408 (e.g., a light sensor) to detect the environment brightness, a distance sensor 410 to detect a distance between the vehicle and a key fob of the vehicle, and a timer 412. It should be appreciated that, in some embodiments, the sensors mentioned above may be the sensor used for other purposes in the vehicle and no separate sensors are required for the illumination system 20.

The controller 300 may be further in communication with the power system of the vehicle to obtain the status information of the power system, such as the "on" status and the "off" status of the power system and moving directions of the vehicle such as moving forwarding and moving in reverse.

The illumination system 20 may further include a manual switch 500 and an independent power source 416 coupled with the illumination device 200. In some embodiments, the controller 300 may activate the illumination device 200 in response to a signal indicating that the movable closure 100 is opened from the movable closure sensor 402 and a signal indicating that the power system is off from a power control system. In this way, when the vehicle 10 is parked and the movable closure 100 (e.g., the trunk lid or the lift gate) is opened, the illumination device 200 may be activated to provide illumination desired by a user.

In some embodiments, the controller 300 may be configured to activate the illumination device 200 for a predetermined time period (e.g., about 5 minutes to about 10 minutes) and then deactivate the illumination device 200. The predetermined time period may correspond the time that would be taken by a user for completing certain activities such as arranging items in the trunk or taking out items from the trunk. In some embodiments, the controller 300 may be configured to deactivate the illumination device 200 in response to the signal indicating that the movable closure 100 is closed.

In some conditions, the illumination is desired by a user to assist driving reversely to park in a dark environment. The illumination system 20 can be configured to provide the desired light when at least one vehicle condition is met. For example, the controller 300 may be configured to compare the speed of the vehicle with a speed threshold and compare the environment brightness with a brightness threshold, and activate the illumination device 200 in response to a signal from the speed sensor indicating that the speed of the vehicle is less than the speed threshold, a signal from the brightness sensor 408 indicating that the environment brightness is less than the brightness threshold, a signal indicating that the vehicle is moving in reverse, and a signal from the movable closure sensor 402 indicating that the movable closure 100 is opened. In this way, the illumination device 200 may be activated to provide the light to assist the user to drive in reverse to park in the dark condition. In this example, the vehicle conditions may include at least one of the following: the vehicle 10 is moving in reverse, the vehicle speed is less than about 5 kilometre per hour (kph), and the environment brightness is less than the brightness threshold.

The controller 300 may be further configured to activate the illumination device 200 in other vehicle conditions. In some embodiments, the controller 300 may be configured to open the movable closure 100 and activate the illumination device 200 in response to a signal indicating the power system of the vehicle 10 is off and a signal indicating unlocking of a door of the vehicle from the key fob. In vehicles using an internal combustion engine (ICE) as the power system, the "off" status of the power system may be the status that the ICE stops running. In vehicles using an ICE and a battery as the power system, the "off" status of the power system may be the status that the ICE and an electric machine stop running. In vehicles using a battery as the power system, the "off" status of the power system may be the status that an electric machine stops running. When a user is walking closer to the vehicle, the movable closure 100 may be controlled to be in the opened position and the illumination device 200 is controlled to be activated, which can assist the user to find his/her vehicle in the dark environment. For example, when the movable closure 100 is in the opened position, the illumination device 200 provides an illumination area or a light ray, such that the user may find the vehicle following the light even if the vehicle is parked in a parking lot having many parked vehicles.

In some embodiments, the controller 300 may be in communication with the SOC sensor 406 and configured to activate the illumination device 200 in response to a signal from the SOC sensor 406 indicating the SOC of the storage battery greater than the SOC threshold and a signal from the movable closure sensor 402 indicating an opened status of the movable closure. The controller 300 may be further configured to deactivate the illumination device 200 in response to a signal from the SOC sensor 406 indicating the SOC of the battery less than the SOC threshold.

In some embodiments, the illumination system 20 may include an independent power source 416. When the power system of the vehicle is deactivated or the SOC of the storage battery is less than the SOC threshold, the illumination device 200 or the illumination system 20 may operate independently via the power source 416.

In some embodiments, as shown in FIGS. 1A and 1B, and 2, the illumination system 20 further includes a switch 500 to activate and deactivate the illumination device 200 manually. In this way, the user may turn on or turn off the illumination device 200 and control the on/off time of the illumination device 200 manually. In the embodiments illustrated in FIGS. 1A and 1B, the switch 500 is disposed on a side wall 12 of the vehicle 10. It should be appreciated that the vehicle 10 may be disposed at any other position that enables users to have an easy access. For example, the switch 500 may be positioned at the movable closure 100 and adjacent to the illumination device 200. In some embodiments, the switch 500 may be disposed at a position that triggers the deactivation of the illumination device 200 when the movable closure 100 is closed. In some embodiments, the illumination system 20 may include circuits and control strategy that enables the illumination device 200 to be deactivated even if the switch 500 is at an "on" position when the movable closure 100 is closed.

Figure 3:
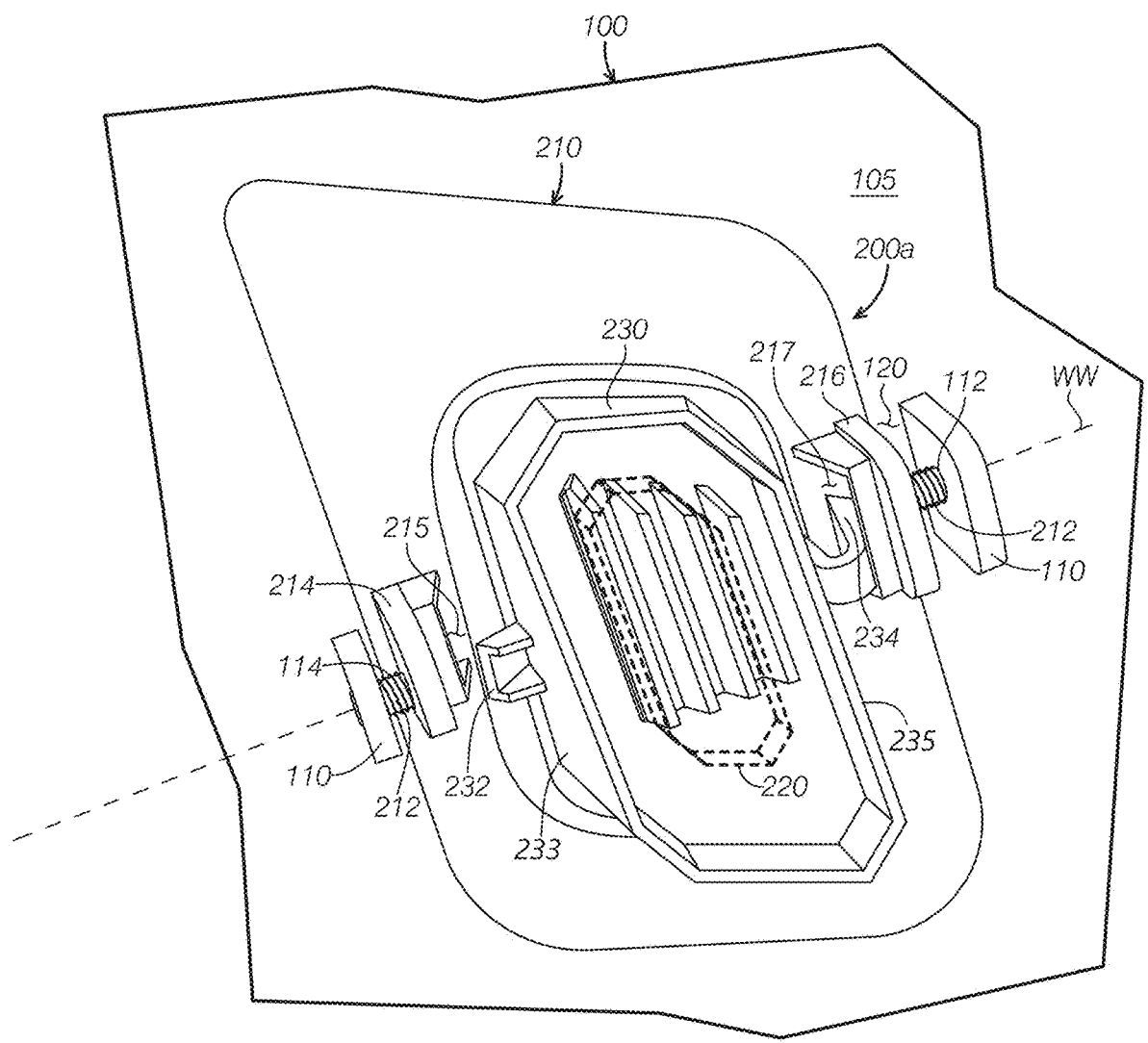
FIG. 3 is a perspective view of an illumination device of the illumination system in FIG. 1A.

FIG. 3 is a perspective view of the illumination device 200a in FIG. 1A, illustrating the illumination device 200a connected to the movable closure 100. It should be appreciated that the illumination device 200b may have a similar structure with the illumination device 200a and will not be described. Referring to FIG. 3, the illumination device 200 includes a bracket 210 and a light source 220. The bracket 210 may be disposed on an inner surface 105 of the movable closure 100 and configured to support the light source 220. With further reference to FIG. 1A, when the movable closure 100 is in an opened position, the bracket 210 is adjacent to or above the top of the vehicle 10. The bracket 210 is rotatably connected to the movable closure 100 such that an illumination area of the light source 220 may vary as the bracket 210 rotates. When the movable closure 100 is in the opened position, the illumination device 200 at a higher position may provide a relative larger illumination range. In this way, the illumination device 200 may provide a desired illumination area for users. For example, when the vehicle 10 is parked for an outdoor activity, the illumination device 200 may provide illumination temporarily for a predetermined time without a need to bring additional illumination device.

In some embodiments, as shown in FIG. 3, the bracket 210 includes two pivoting pins 212 at two opposite sides. The movable closure 100 may include two supporting plates 110 disposed on the inner surface 105 and each supporting plate 110 has two receiving grooves 112. In some embodiments, a line connecting the two receiving grooves 112 may be parallel to the widthwise direction W of the vehicle 10. The pivoting pin 212 is partially received in the receiving groove 112 and rotatable relative to the supporting plate 110. For example, the bracket 210 may be disposed between two supporting plates 110 and rotatable around the axis WW substantially parallel to the widthwise direction W of the vehicle. When the movable closure 100 is in the opened position as shown in FIG. 1A, the illumination device 200 may be rotated to selectively illuminate areas in the trunk or areas at the rear of the vehicle 10.

With further reference to FIG. 1A, the illumination device 200a may rotate rearwards about the axis WW to direct the illumination area further rearwards at the rear of the vehicle, and the illumination device 200a may rotate forwards about the axis WW to direct the illumination area towards the trunk of the vehicle. In some embodiments, the illumination system 20 may include two illumination device 200a, 200b. The illumination device 200a, 200b may be both configured to rotate rearwards or forwards around the axis WW to adjust the illumination area in the lengthwise direction L of the vehicle. In this way, the user may adjust the illumination area according to practical requirements to obtain desired illumination range.

In some embodiments, a damper 114 is disposed around the pivoting pin 212 with one end adjacent or connected to the receiving groove 112 to control a rotating speed of the bracket 210. The damper 114 may be a damper known to those with ordinary skills in the art, such as a coil spring, which will not be described in details.

In some embodiments, the illumination device 200 may further include a lens 230 detachably disposed on the bracket 210. The light source 220 may be disposed between the bracket 210 and the lens 230. The lens 230 is used to dispense lights emitted by the light source 220.

In some embodiments, the bracket 210 includes a first baffle plate 214 and a second baffle plate 216 which are disposed at two opposite ends of the bracket 210, respectively. One pivoting pin 212 is disposed between the first baffle plate 214 and the supporting plate 110. Another pivoting pin 212 is disclosed between the second baffle plates 216 and the supporting plates 110. The pivoting pins 212 are received in the receiving groove 112 and connected to the first baffle plate and the second baffle plate. One side of the first baffle plate 214 faces toward the light source 220 and has a first recessed portion 215. One side of the second baffle plate 216 faces the light source 220 and has a second recessed portion 217.

The lens 230 includes a protrusion 232 at a first side 233 and a flexible clip 234 at a second side 235 opposite the first side 233. The protrusion 232 may be positioned in the first recessed portion 215. The clip 234 may be deformable. During assembling of the lens 230, the clip 234 may be retracted under an external force to create a space to allow the protrusion 232 to be inserted into the first recessed portion 215 and extended to a normal state against the second recessed portion 217 upon release of the external force such that the lens 230 is fixed on the bracket 210.

In some embodiments, the illumination device 200a, 200b may be rotatable around two different axes. In one embodiment, the illumination device 200b may have a structure similar to the illumination device 200a as shown in FIG. 3, however, a line connecting two receiving grooves 112 of the supporting plate 110 of the illumination device 200b is perpendicular to the axis WW. That is, the illumination device 200b is rotatable around the axis LL substantially perpendicular to the axis WW. Referring to FIG. 1B, when the movable closure 100 is in the opened position, the axis LL is substantially parallel to a longitudinal direction of the vehicle 10. The illumination device 200b may rotate around the axis LL to adjust the illumination area along the transverse direction of the vehicle. In this way, when the movable closure 100 is in the opened position as shown in FIGS. 1A and 1B, two illumination devices 200a, 200b may rotate around different axes to selectively adjust illumination areas along the longitudinal direction and the transverse direction.

Figure 4:
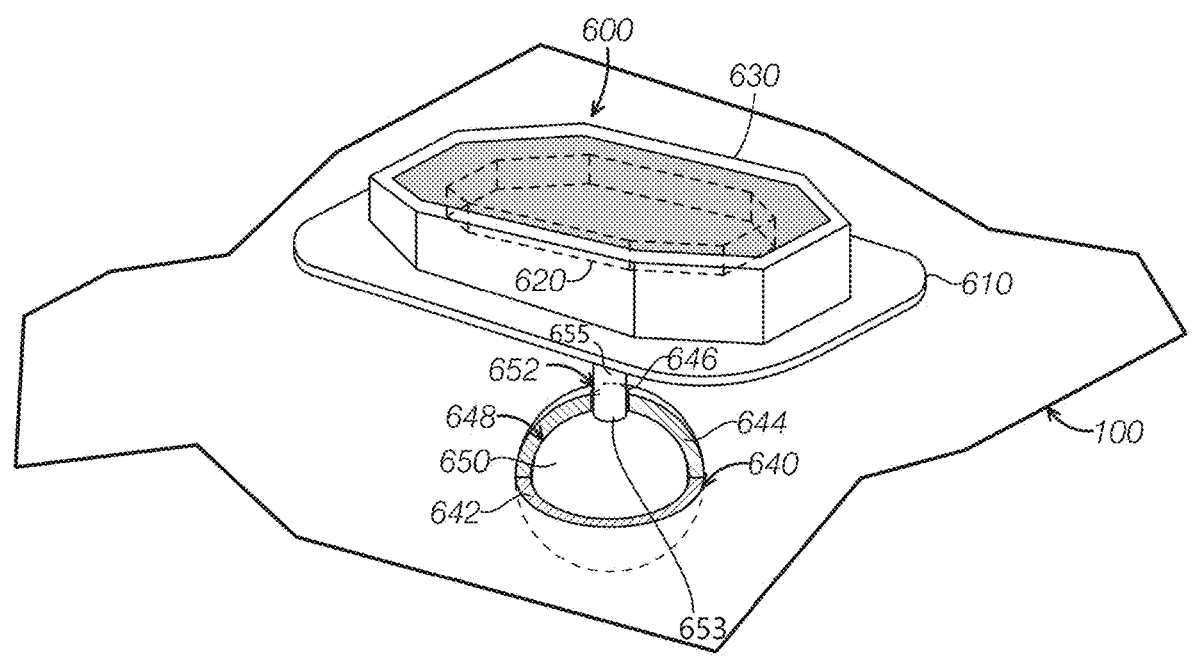
FIG. 4 is a perspective view of an illumination device of an illumination system according to another embodiment of the present disclosure.

In some embodiments, the bracket 210 may be connected to the movable closure 100 via structures different from that illustrated in FIG. 3. FIG. 4 illustrates an illumination device 600 according to another embodiment of the present disclosure. For the sake of brevity, in this example, the elements and features similar to those previously shown and described will not be described in much further detail. In other words, differences between the present embodiment and the embodiment of FIG. 3 will be mainly described. Referring to FIG. 4, the illumination device 600 includes a bracket 610, a light source 620 disposed on the bracket 610, a lens 630, and a rotary connector 640. The rotary connector 640 includes a housing 642 fixed to the movable closure 100 and a rotary element 648 coupled with and rotatable in the housing 642. The housing 642 includes a ball-shaped chamber 644 and a through hole 646 extending from the chamber 644 to an outer surface of the housing 642. The rotary element 648 includes a ball-shaped body 650 received and rotatable in the chamber 644 and a rod 652. The rod 652 has a first end 653 extending through the through hole 646 and connected to the body 650 and a second end 655 fixed to the bracket 610. The through hole 646 has a size (e.g., a diameter or a cross-section area) larger than a size (e.g., a diameter or a cross-section area) of the rod 652 such that the rod 652 may be moved in the through hole 646 to cause the rotation of the body 650 in the housing 642. In this way, the bracket 610 connected to the second end 655 of the rod 652 can be rotated relative to the movable closure 100 by operating or moving the rod 652. As both the body 650 and the chamber 644 are ball-shaped, the bracket 610 connected to the rotary connector 640 can rotate in various directions so that the illumination areas from the light source 630 can be adjusted accordingly. In an embodiment, lubricants may be dispersed between the body 650 and the rotary element 648.

Figure 5:
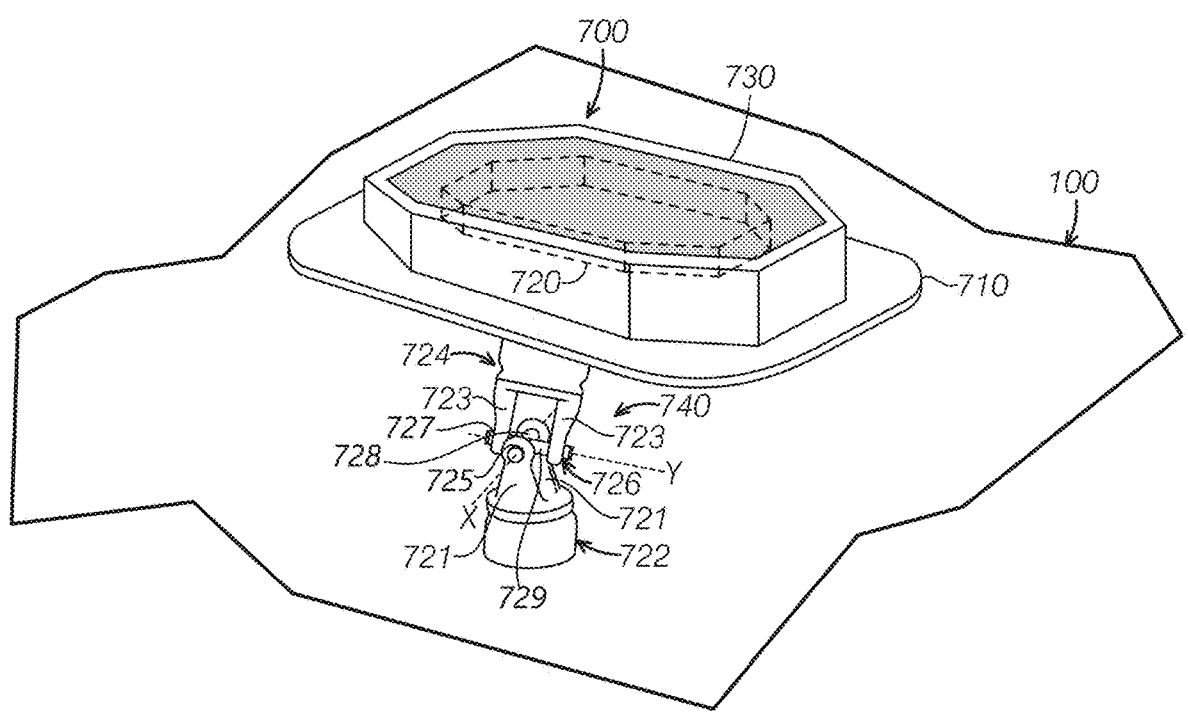
FIG. 5 is a perspective view of an illumination device of an illumination system according to another embodiment of the present disclosure.

FIG. 5 illustrates an illumination device 700 according to another embodiment of the present disclosure. For the sake of brevity, in this example, the elements and features similar to those previously shown and described will not be described in much further detail. In other words, differences between the present embodiment and the embodiment of FIG. 3 and FIG. 4 will be mainly described. Referring to FIG. 5, the illumination device 700 includes a bracket 710, a light source 720 disposed on the bracket 710, a lens 730, and a rotary connector 740. The rotary connector 740 includes a first element 722 fixed to the movable closure 100, a second element 724 fixed to the bracket 710, and a cross-shaped element 726 connecting the first and second elements 722, 724. The first element 722 includes two spaced apart first arms 721 at an end. Each of the first arms 721 has a first hole 725 at a free end. The second element 724 includes two spaced apart second arms 723 at an end. Each of the two second arms 723 has a second holes 727 at the free end. The cross-shaped element 726 includes a first bar 728 and a second bar 729 crossed with each other. Two ends of the first bar 728 are received in the first holes 725 of the first arm 721, and the first bar 728 is rotatable around a first axis X. Two ends of the second bar 729 are received in the second holes 727 of the second arm 723, and the second bar 729 is rotatable around a second axis Y substantially perpendicular to the first axis X. When the first element 722 is fixed, the second element 724 may rotate around the first axis X by rotating the first bar 728 around the first axis X, and the rotation of the first bar 728 further causes the second element 724 to rotate around the second axis Y. In this way, the bracket 710 may be rotated in various different directions via the rotary connector 740.

It should be appreciated that, the rotary connectors are not limited to those shown in FIGS. 3-5, other universal joints may also be applied in the embodiments of the present disclosure, which are also included in the scope of the present disclosure.

According to embodiments of the present disclosure, the illumination device is disposed at a higher position when the movable closure of the vehicle is moved to the opened position, which can provide a relatively larger illumination range. The illumination device can be rotatable relative to the movable closure, and thus the user is capable of adjusting the illumination area base on the needs for the light. In addition, the illumination device can be activated automatically in response to various vehicle conditions.

It will be appreciated that the configurations and routines disclosed herein are exemplary in nature, and that these specific embodiments are not to be considered in a limiting sense, because numerous variations are possible. It should be appreciated that the embodiments described above are specific examples that do not encompass all possible forms of the disclosure. The features of the illustrated embodiments may be combined to form additional or alternative embodiments of the disclosed concepts. The words used in the specification are words of description rather than limitation, and it is understood that changes can be made without departing from the spirit and scope of the disclosure.

The invention claimed is:

1. An illumination system for a vehicle, comprising:
an illumination device including:
a light source, and
a bracket connected to the light source, wherein the bracket is adapted to be rotatably connected on an inner surface of a movable closure of the vehicle and rotatable around an axis parallel to a lengthwise direction of the vehicle, and the bracket is adjacent to a top of the vehicle when the movable closure is in an opened position, and wherein an illumination area of the light source varies as the bracket rotates.

2. The illumination system of claim 1, wherein the movable closure is a lift gate of the vehicle.

3. The illumination system of claim 1, wherein the bracket is connected to the movable closure via a pivoting pin and a damper is coupled to the pivoting pin to adjust a rotating speed of the bracket.

4. The illumination system of claim 1, wherein the bracket is connected to the movable closure via a universal joint such that the bracket is rotatable to multiple directions in addition to rotatable around an axis parallel to the lengthwise direction of the vehicle.

5. The illumination system of claim 4, wherein the universal joint comprises a housing fixed on the movable closure and a rotary element fixed on the bracket, and wherein the housing has a ball-shaped chamber, and the rotary element has a ball-shaped body received and movable in the ball-shaped chamber.

6. The illumination system of claim 4, wherein the universal joint comprises a first element fixed to the movable closure, a second element fixed to the bracket, and a cross-shaped element connecting the first and second elements; wherein the first element includes two first arms spaced apart each other and each having a first hole, wherein the second element includes two second arms space apart each other and each having a second hole, wherein the cross-shaped elements includes a first bar and a second bar crossed with each other; and wherein two ends of the first bar are received in first holes of the first arms and rotatable round a first axis, and two ends of second bar are received in second holes of the second arms and rotatable round a second axis substantially perpendicular to the first axis.

7. The illumination system of claim 1, wherein the illumination device further comprises a detachable lens covering the light source and dispensing light beams emitted by the light source, and the illumination system further comprises a switch to manually activate and deactivate the light source.

8. The illumination system of claim 7, wherein the bracket includes a first baffle plate and a second baffle plate disposed at two opposite ends thereof, wherein the first baffle plate includes a first recessed portion and the second baffle plate includes a second recessed portion, and wherein the lens has a protrusion at a first side and a flexible clip at a second side, and the clip is configured to be deformable to facilitate an assembling of the lens on the bracket.

9. The illumination system of claim 1, further comprising a controller configured to activate the light source when at least one vehicle condition is met.

10. The illumination system of claim 9, wherein the vehicle condition includes the movable closure in the opened position and a power system of the vehicle at an "off" status.

11. The illumination system of claim 9, wherein the vehicle condition includes the movable closure in the opened position and a speed of the vehicle less than a threshold speed.

12. The illumination system of claim 9, wherein the light source is coupled to a battery of the vehicle, and the vehicle condition includes a state of charge of the battery larger than a state of charge threshold.

13. An illumination system for a vehicle, comprising:
two illumination devices disposed on an inner surface of a movable closure of the vehicle and spaced apart each other, each illumination device including:
 a bracket, and
 a light source connected to the bracket, wherein the bracket is rotatably connected to an inner surface of the movable closure of the vehicle; and rotatable such that an illumination area of the light source varies as the bracket rotates,
wherein the two illumination devices are located adjacent to a vehicle floor of when the movable closure is in a closed position, and located adjacent to a top of the vehicle when the movable closure is in an opened position; and
a controller, wherein the controller includes a processor and a sensor, and configured to selectively and automatically activate the two illumination devices in response to at a signal from a sensor indicating least one vehicle condition.

14. The illumination system of claim 13, wherein the bracket of each of the two illumination devices is configured to rotate around an axis parallel to a widthwise direction of the vehicle.

15. The illumination system of claim 13, wherein the bracket of one of the two illumination devices is configured to rotate around an axis parallel to a widthwise direction of the vehicle and the bracket of another of the two illumination devices is configured to rotate around an axis parallel to a lengthwise direction of the vehicle.

16. The illumination system of claim 13, wherein the at least one vehicle condition includes the following conditions: the movable closure is in the opened position, the vehicle is moving in reverse at a speed less than about 5 kph, and an environment illumination is less than an illumination threshold.

17. The illumination system of claim 13, the controller is further configured to open the movable closure in response to a signal indicating an "off" status of a power source of the vehicle and a signal indicating unlocking of a vehicle door.

18. The illumination system of claim 13, further comprising an independent power source to supply power to the illumination system.

19. The illumination system of claim 13, wherein the controller is further configured to turn off the light source of the illumination devices in response to a signal indicating a closed status of the movable closure.

20. An illumination system for a vehicle, comprising:
an illumination device, wherein the illumination device includes a bracket, and a light source connected to the bracket, wherein the bracket is rotatably connected to an inner surface of a movable closure of the vehicle, and rotatable to generate at least two illumination areas of the light source at use positions, and wherein the illumination device is located adjacent to a vehicle floor of when the movable closure is in a closed position, and located adjacent to a top of the vehicle when the movable closure is in an opened position; and
a controller, wherein the controller includes a processor and a sensor and configured to selectively and automatically activate the illumination device in response to a signal from a sensor indicating at least one vehicle condition.

* * * * *